July 20, 1937.   E. D. TILLYER   2,087,270
OPHTHALMIC LENS
Filed July 12, 1935
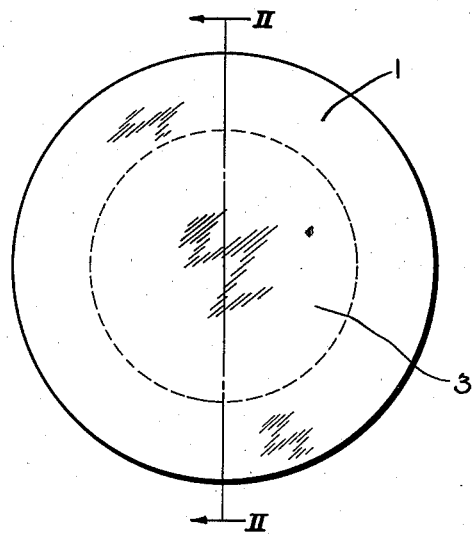
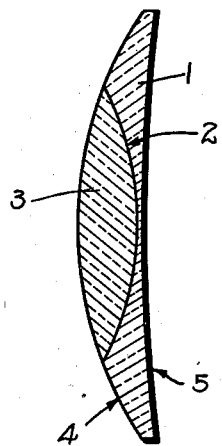
FIG. I   FIG. II
INVENTOR
EdgarD.Tillyer
BY
Harry H. Styll
ATTORNEY Patented July 20, 1937

2,087,270

UNITED STATES PATENT OFFICE 2,087,270

OPHTHALMIC LENS

Edgar D. Tillyer, Southbridge, Mass., assignor to American Optical Company, Southbridge, Mass., a voluntary association of Massachusetts Application July 12, 1935, Serial No. 31,005

8 Claims. (Cl. 88—54)

This invention relates to improvements in ophthalmic lenses and has particular reference to a novel and improved construction of lens and method of making the same.

One of the principal objects of this invention is to provide novel and improved means and method of making a cataract lens whereby the chromatic aberration inherent in most lenses of this nature in the past is greatly reduced or eliminated without materially increasing the usual size and weight of lenses of this nature.

Another object of the invention is to provide a cataract lens of the type formed of a major piece of glass having a segment button of a different kind of glass fused in a countersink formed in said major portion wherein the segment button will be substantially invisible to anyone looking at the person wearing the lens.

Another object is to provide a lens of the above character wherein the correction for focal power is approximately the same at the outer edge area of the lens as it is at the central segment area so that there is vision through said outer area as well as the central area.

Other objects and advantages of the invention will become apparent from the following description taken in connection with the accompanying drawing and it will be apparent that many changes may be made in the details of construction, arrangement of parts and steps of the method shown and described without departing from the spirit of the invention as expressed in the accompanying claims. I, therefore, do not wish to be limited to the exact details shown and described as the preferred form and method only have been shown and described by way of illustration.

Referring to the drawing:

Fig. I is a front elevation of a lens embodying the invention; and

Fig. II is a sectional view taken on line II—II of Fig. I looking in the direction indicated by the arrows.

It is well known that after the operation for cataract has been performed on an eye previously of normal or nearly normal vision, a very strong positive lens is needed in front of the eye to make up for the crystalline lens which has been removed. The present invention is directed particularly to forming an improved lens for use with such an aphakic eye or eye from which the crystalline lens has been removed or any strong positive correction.

In producing lenses of the above character, in the past, there has been two distinct difficulties involved. The first difficulty was that of obtaining a lens practical for use as regards to its thickness, weight and appearance. The other difficulty was that of obtaining a lens practical for use as regards to color or chromatic aberrations. Both of the above difficulties have been specifically dealt with in the past.

It has been usual in the past to form cataract lenses from ordinary optical crown glass. Such glass, in order to obtain the size of lens and surface curvatures, required to produce the desired focal power, necessitated the use of a very thick, and unsightly piece of glass. Some attempts have been made to overcome this particular difficulty in lenses of this nature by utilizing a high index glass, such as flint, having a higher index of refraction than ordinary optical crown glass because with such high index glasses a lens of the same focal power may be obtained with flatter curves and from a thinner piece of glass. Although the use of high index glasses is more desirable from the above standpoint, such glasses have more dispersion than ordinary optical crown glass and therefore increase the chromatic aberration of the finished lens to such a degree as to render them undesirable for use.

The chromatic aberration present in a lens formed of ordinary optical crown glass, as set forth above, although lower than flint glass, is in itself very annoying and has been specifically dealt with, in the past, with a view to forming an achromatic lens. To accomplish this result an attempted use of ordinary crown glass combined with ordinary flint glass of a different index of refraction was tried but such lenses were found to be too thick, very heavy and unsightly and were also undesirable. This was due primarily to the fact that the attempt was made to make the lens achromatic over its whole area.

It, therefore, is one of the primary objects of this invention to form a cataract lens or other strong positive lenses which are more desirable both from the standpoint of thickness and weight and from the standpoint of color or chromatic aberration, and in which vision is provided throughout the entire area of the lens.

Referring more particularly to the drawing wherein like characters of reference designate like parts throughout the several views, the invention is directed primarily to the provision of a lens formed by first carefully selecting glasses which are of such indices of refraction that flatter curves and a thinner composite piece of glass than has been usual in the past may be employed in obtaining the focal powers desired and whose reciprocal relative dispersions are such that when combined with each other a lens having less chromatic aberration than an ordinary optical crown glass lens may be obtained, which chromatic aberration will be so slight that it is hardly distinguishable by the naked eye. By careful reduction of the thickness of the lens and use of flatter curves together with the reduction of the chromatic aberration to a negligible degree, there is provided a lens which is more desirable both from the aesthetical and optical standpoint than has been hitherto obtained in lenses of this nature.

The lens embodying the invention as shown in Figures I and II, and which is shown herein only as an example of my invention, is produced by first selecting a flint glass having an index of refraction of approximately 1.61 and a reciprocal relative dispersion of approximately 36, the usual dispersion, and forming a countersink 2 therein. The countersink is surfaced to a curvature of approximately 19.50 diopters. A segment button 3 is then formed of a barium crown glass having an index of refraction of approximately 1.61 and a reciprocal relative dispersion of approximately 50. This countersink button is provided with a surface curvature substantially equal to the curvature of the countersink and is fused therein as shown in Fig. II. The composite blank thus formed is provided on the front or segment side thereof with a surface curvature of approximately 14.07 diopters as illustrated at 4 in Fig. II. The rear or ocular surface 5 in this particular example is provided with a minus 3.00 diopter curve. The resultant power obtained by the 1.61 index of refraction of the separate portions of glass and the surface curvatures 4 and 5 is substantially plus 14 diopters.

By selecting glasses having reciprocal relative dispersions of the above ratio, the resultant chromatic aberration of the lens will be less than one-tenth of a diopter and is negligible being much less than the ordinary ophthalmic crown lens of plus 14 diopters.

It is to be understood however that if desired the lens can be made exactly achromatic by the proper balancing of the curves, but it is not generally desired to go that far. As previously stated above, the chromatic aberration of the lens set forth herein, is approximately 0.09 or less than one-tenth of a diopter. When compared with ordinary optical crown glass lenses having a chromatic aberration of about one-quarter of a diopter and a lens made of high index flint having a chromatic aberration of about four-tenths of a diopter, it will be seen that I have greatly reduced this error and I have brought it down to a negligible degree. By tolerating such a slight amount of chromatic aberration, I am able to utilize more desirable curves in obtaining the focal power desired and am able to reduce the thickness and weight of the finished lens. The lens set forth above is preferably reduced to a 1.1 millimeter edge thickness for a lens 42 millimeters in diameter.

The lens illustrated is a sphere. Obviously, sphero cylinder corrections can be obtained by putting a toric curve on either surface but generally better optical results will be obtained by putting the toric curve on the ocular surface.

By utilizing lens mediums for the portions 1 and 3 having substantially the same index of refraction I have provided vision throughout the entire area of my lens, that is, the area surrounding the segment button 3 although not achromatic will enable vision to be obtained therethrough. This area, of course, is outside of the limits of the most usable portion of the lens or segment area and is only occasionally made use of.

The segment button 3 is preferably formed substantially 27 millimeters in diameter and is located substantially in the center of the major portion 1 as this has been found to be a very practical size of segment and location thereof relative to said major portion.

The various optical surfaces 2, 4 and 5 of the lens are formed by grinding and polishing said surfaces to the required curvature in the usual prior art manner.

By means of this invention I have reduced the chromatic aberration to less than ordinary optical crown glass lenses, and at the same time I have reduced the curvature of the opposed surfaces of the lens and its thickness to substantially that of an ordinary high index lens.

It is to be understood that the above figures are set forth only by way of illustration of how a lens embodying the features of the invention may be obtained as it is quite apparent that several different power lenses or lenses of the same power as that set forth herein might be obtained by selecting the proper indices of refraction and reciprocal relative dispersions which when combined with the proper surface curvatures will produce similar results. The essence, therefore, of my invention is to select glasses having substantially the same indices of refraction for the different portions of the lens and to balance the reciprocal relative dispersions of said portions so as to reduce the chromatic aberration of the lens and reduce the thickness, weight, etc. of the finished lens.

From the foregoing description, it will be seen that I have provided simple, efficient and economical means and method of accomplishing all of the objects and advantages of the invention.

Having described my invention, I claim:

1. A lens comprising a major piece of high index and high dispersion, having a countersink therein, a segment of sensibly the same index as that of the major piece but of lower dispersion secured in said countersink, and continuous optical surfaces on the opposite sides of said lens so related to said countersink to produce a lens of uniform focal power throughout and having an achromatic field the same size as said segment.

2. A lens having outer optical surfaces and having adjacent fields of substantially the same focal power, one of said fields being formed of a single piece of glass and the other being formed of a second piece combined with said first piece of glass, one of said pieces being of high dispersion high index glass and the other of low dispersion high index glass of substantially the same index of refraction as the first piece, said pieces being united on a curved dividing surface so related to said outer optical surfaces of said lens to substantially reduce chromatic aberration throughout the field of said combined pieces, while having substantially the same focal power throughout the entire field of the lens.

3. A composite lens comprising a piece of glass of known index and dispersion having optical surfaces thereon to form a negative lens, a second piece of glass having optical surfaces thereon to form a positive lens, one of the surfaces of said positive and negative lenses being complemental and fused together, the glass forming the positive lens having a higher reciprocal relative dispersive factor than the glass forming the negative lens, the glasses of both of the lenses having substantially the same indices of refraction.

4. A lens having separate adjacent fields of substantially the same focal power, one of said fields comprising a piece of glass of high index and high dispersion, the other of said fields comprising a glass of substantially the same index as that of said first piece of glass but of lower dispersion and joined to said first piece of glass on a dividing surface concave outwardly from said first piece of glass, and a positive continuous optical surface over one side of said first piece and said second piece, and a continuous optical surface over the opposite side of said composite lens.

5. A composite lens comprising a double convex lens of high index low dispersion glass, a concavo-convex lens of the same index as said convex lens but of a higher dispersion and having a concave depression in the convex side thereof, said lenses being secured together with one convex side of said convex lens being secured to said concave depression, the outer surface of said convex lens forming a continuous surface with the optical surface on the convex side of said concavo-convex lens.

6. A lens comprising at least two pieces of lens medium of relatively high and substantially the same indices of refraction, secured together in superimposed relation with each other on a curved dividing surface with one piece extending beyond the other, said pieces of lens medium having continuous optical surfaces on the outer opposite sides thereof, said dividing surface intersecting one of said optical surfaces, the reciprocal relative dispersions of said superimposed pieces being different by an amount sufficient to substantially reduce chromatic aberration throughout the superimposed pieces, the indices of refraction of said pieces being substantially identical, whereby said composite lens will have substantially the same focal power throughout its area and the dividing line between said superimposed and single piece being substantially invisible.

7. A lens comprising a piece of glass of known index of refraction and dispersive factor having optical surfaces thereon to form a lens, a second piece of glass having optical surfaces thereon to form a lens, one of the surfaces of each of said pieces being complemental and secured together, the glass forming both lens elements having substantially the same index of refraction, but the glass forming one of said lens elements having a higher reciprocal relative dispersion than the glass forming the other of said elements, whereby the composite lens will have substantially the same focal power throughout its field and will be substantially free from chromatic aberration throughout the field of said superimposed layers of glass and substantially invisible.

8. A blank for a lens comprising a piece of glass having a negative optical surface thereon and a second piece of glass having a positive optical surface secured to the negative surface in superimposed relation with the first piece of glass, the glass having the positive surface thereon having a higher reciprocal relative dispersion than the glass having the negative surface with both of said pieces of glass having substantially the same indices of refraction, a finished optical surface on one side of the composite piece of glass and a face on the other side of said composite piece of glass which may be surfaced to produce the final focal power desired, whereby a finished lens may be formed which will be substantially free from chromatic aberration throughout the field of said superimposed layers of glass with the joinder of the second piece of glass with the first piece being substantially invisible, one of said pieces of glass extending beyond the other and having substantially the same focal power as that of the superimposed pieces of glass in the finished lens.

EDGAR D. TILLYER.